March 15, 1938.   J. J. JENSEN   2,111,365

CONFECTIONERY MOLD STRUCTURE

Original Filed July 13, 1934

Inventor:
Jens Johannes Jensen
By Haseltine, Lake & Co.
Attys.

Patented Mar. 15, 1938

2,111,365

UNITED STATES PATENT OFFICE 2,111,365

CONFECTIONERY MOLD STRUCTURE

Jens Johannes Jensen, Copenhagen, Denmark, assignor to Boggild & Jacobsen, Copenhagen, Denmark Original application July 13, 1934, Serial No. 734,885, now Patent No. 2,055,605, dated September 29, 1936. Divided and this application August 29, 1936, Serial No. 98,469. In Germany July 18, 1933

3 Claims. (Cl. 107—19)

This invention relates to mold structure for confectionery in the manufacture of filled chocolates and the like and particularly to the type of mold structure used in conjunction with, or upon, confection filling machines.

The main object of my invention is to provide simple and easily made molds which are of such nature and construction that it will produce clean cut confection fillings and casts, free from drips and tails or irregular projections.

Another object is to have molds of the character indicated which are easily placed in position and as easily removed and which are also very efficient in form so as to readily co-operate with a machine upon which they are installed for producing a uniform product.

Other objects, and the advantages accruing from the nature, construction, and use of my invention will appear more fully herein as this specification proceeds.

In the accompanying drawing forming part hereof,

Throughout the views the same reference numerals indicate the same or corresponding parts.

Figure 1:
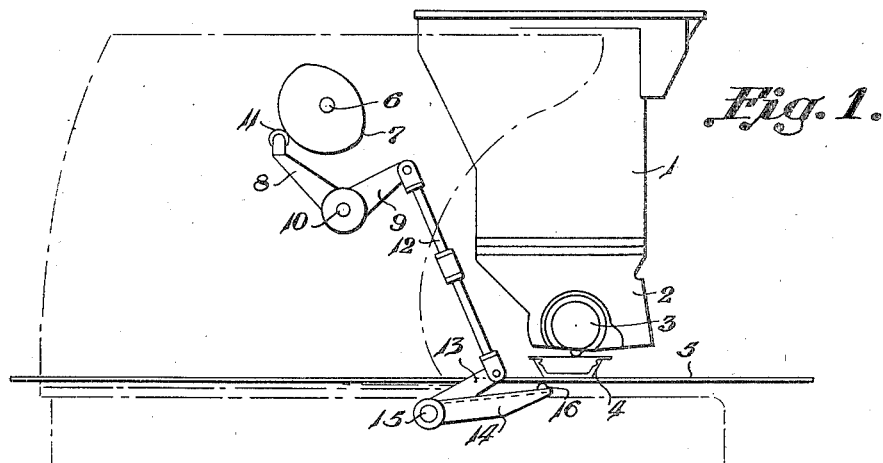
Fig. 1 is a general view of part of a confectionery machine provided with a mold structure embodying the present invention and disposed in an operative position.
Figure 2:
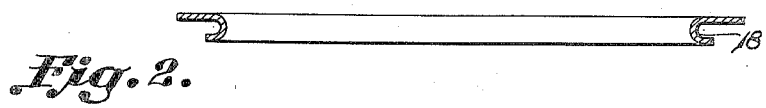
Fig. 2 is a vertical cross section of a mold frame forming part of the mold structure.
Figure 3:
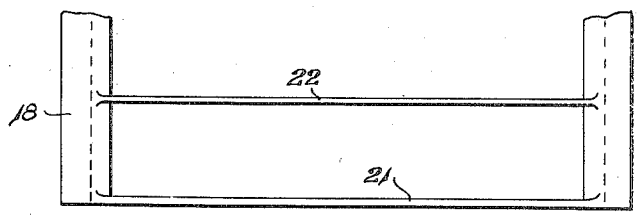
Fig. 3 is a fragmentary plan view of the same.

This application is in the nature of a division of my co-pending application Serial No. 734,885 filed July 13, 1934, which issued Sept. 29, 1936, as Patent No. 2,055,605.

Upon confectionery machines utilizing molds of the present type, and intended for the manufacture of chocolates, confections and the like, it is usual first to pour a chocolate shell into the molds in the mold plates which are preferably moved past a chocolate pouring device, after which said molds are passed beneath a crème-pouring device which pours the crème or other desired filler into the shell to form a core therein, and the shell is subsequently closed by a cover cast into position thereon.

The main disadvantage appearing in the operation is the difficulty of pouring the crème properly, due to the tough slimy and viscous character thereof, causing the pouring to be difficult and troublesome, as the crème during pouring tends to be drawn out into long tough threads or tails which become deposited upon the upper surfaces and edges of the mold plates in such manner as to prevent the subsequent pouring or casting of the cover. The material poured also tends to drop from the edges of the molds and between molds onto the mold frames and conveying chains or other parts in undesirable manner.

Hence with the foregoing objects in view and in order to eliminate the mentioned disadvantages, the present invention is designed to make it easily possible and practical to pour crème or other filler into chocolate shells and the like in such manner that the tough thread or tail formed at the end of the process is not deposited upon the upper surface or edge of the mold plate involved. The operation of the pouring hopper for the crème which assists in bringing about this desirable result, as well as the mechanism for operating the same are fully explained in my co-pending application above identified, and as these structures form no actual part of the present invention, it will suffice to show the pouring hopper in position over the mold structure, together with means for supporting and raising said mold structure so as to best co-operate with the hopper and utilize the shape of the mold plate and mold structure.

The molds are hollow cups of various shapes, a greater or smaller number of said molds being provided in the mold plates, which are supported on mold frames adapted to be pushed into position on mold-frame holders provided on endless chains, in such manner that the mold frames can easily be pushed onto and again removed from the mold-frame holders.

This exchange of the mold frames is effected when chocolates of other shapes are to be cast.

It is absolutely necessary that the mold plates with the mold formed therein should have a plane and smooth surface, and that the said mold plates should project beyond the mold frames and the mold-frame holders and the machinery below the same, since thereby it becomes possible to scrape away from the mold plates any superfluous chocolate, and it is thus a main feature of the invention to provide a special arrangement of the mold plates and the parts connected thereto.

The machine to which the invention is applied may include a continuously moved mold conveyor supporting fixed mold-frame holders with exchangeable mold frame with mold plates containing the said molds which are first filled with chocolate, after which the mold plates with the molds will pass a shaking table and will be turned upside down in such a manner that the surplus chocolate runs off. Then the molds will pass a cooling closet in order to be cooled sufficiently to a very low temperature, so that the crème received may be as hot as possible without fusing the chocolate shell formed. Now the crème is poured into position, and then the molds pass another vibrating table, a cooling closet and a heating device in order to melt the top edge of the chocolate shell, before the covering layer is applied. Then the covering layer is applied, the surplus material is scraped away, and the molds now pass over a shaking table to a cooling closet, after which the finished confections are finally shaken out from the molds.

In the practice of my invention, the supply of material for filling the molds may be for example, a hopper 1 provided with pumping devices 2, and a pouring valve 3, all of which are explained in detail in my co-pending application, already alluded to, including means for operating the pouring valve and swinging or moving the hopper in desired manner. However, as the details, and operation of these parts form no actual part of the present invention but merely a background therefor, mere allusion thereto as already given will perhaps suffice. Thus, the pouring hopper is intended to contain the filling material to be poured into the molds, while the pouring valve controls the pouring in more or less obvious manner which hardly needs to be considered here.

Nevertheless, a mold assemblage 4 is located below the pouring valve and hopper so as to receive the intended filling from the same, and will preferably rest upon a conveyor or the like indicated at 5, the mold assemblage shown being only one of a series which may be brought successively into position beneath the hopper. In general, it has been found desirable to raise each mold assemblage into tolerably close proximity to the pouring valve during the pouring, and for this purpose, the machine may have a driven shaft 6 carrying a cam 7 controlling the position and movements of a bell crank lever 8, 9 pivoted at 10 and provided with a roller 11 on its arm 8 bearing against the cam. The other arm 9 of said lever is connected by a link 12 to an arm 13 of an elevating lever 14 which is pivoted at 15 and has a member 16 disposed beneath rails supporting the conveyor 5. When rotation of shaft 6 causes the cam disk 7 to shift lever 8, 9 in a counter-clockwise direction so as to lift link 12, the latter will cause a corresponding movement of lever 13, 14 about its pivot 15 and will thereby raise the rails supporting the conveyor, with the result that conveyor 5 is raised and will in turn raise the mold assemblage 4 toward the nozzle of the pouring valve 3.

Now in order to efficiently receive the crème or other material intended to be dispensed by the pouring valve, the mold equipment with which the machine is provided is of special construction and character. Obviously, the size and form of cam disk 7 is selected to be such that the molds can only be raised to operative position during actual deposit of the crème so that the molds are close to the valve and will cause the strings or tails of crème formed by the pouring to be smeared out or off from the molds. If, however, after the pouring a small remainder of the mentioned tough string or tail of crème should remain upon the lower portion of the valve, the same will be broken off by the lowering of the molds.

Figure 4:
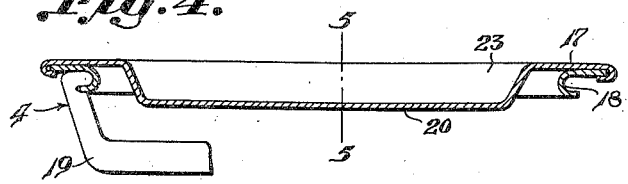
Fig. 4 illustrates in vertical section, a mold structure including a mold plate with molds, a mold frame and part of a mold frame holder.
Figure 5:
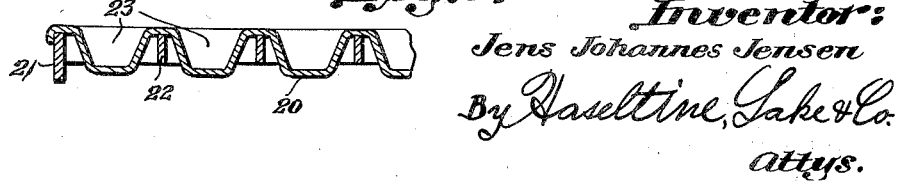
Fig. 5 is a longitudinal section of the same on line V—V in Fig. 4.

Figs. 2 to 5 illustrate the construction of the molds per se. The mold plate consists of a sheet or flat piece of tin plate or other suitable metal or substance 17 attached to and forming a part of a mold frame 18 formed from U-shaped iron bars in such manner that the upper surface of this frame projects horizontally beyond the extent of the lower portion thereof, and, as shown in Fig. 4, can be readily pushed into position on a mold plate holder 19. In the mold plate 17 the individual molds 20 may be given their proper form by stamping so as to have the shape shown in the drawing. In other words, the molds may be formed of a single sheet of metal or other suitable material so as to constitute an integral unit in which each mold cavity 23 comprises a mold.

In view of the fact that the upper leg of the U-shaped frame is conceivably wider than the lower leg of said frame, the frame will project beyond the portion 19 of the mold plate holder in such manner that the entire mold plate will present a perfectly smooth upper surface, especially adapted to co-operate with a scraper or the like. In order to re-inforce the molds, supporting rails 21 and 22 are interposed between the frame parts 18.

In view of the foregoing description it is evident that when molds of the present construction present a smooth and flat top surface to a discharge valve, while said molds are in motion past said valve, or if the hopper provided with said valve is moved past said molds, the tough strings or tails of filler which may be left after the valve has been closed will readily be smeared and broken off and thus the contents in the form of fillings or casts within the molds will be clean-cut and free from projections or strings, and the molds themselves capable of being inverted or turned over on a flat plate for emptying said molds without it being necessary to observe any special precautions to avoid strings or runs upon the edges of the molds.

Having now fully described my invention, I claim:

1. In a mold structure adapted to cooperate with a pouring valve of a hopper upon a confectionery pouring machine, there being a plurality of molds, the combination of a mold frame holder adapted to be conveyed past said hopper beneath the valve thereof, a mold frame adapted to rest upon said mold frame holder comprising a pair of spaced parallel J-shaped metal members having the longer limbs uppermost and directed outward in opposite directions, and a plurality of spaced flat metal ribs connecting said first two metal members and being disposed in vertical planes with their narrow edges uppermost, there being molds adapted to rest upon said mold frame and having a straight upper surface portion which extends smoothly in opposite directions over said J-shaped metal members so as to protect the mold frame holder and mold frame from droppings escaping from said pouring valve.

2. In a mold structure adapted to cooperate with a pouring valve of a hopper upon a confectionery pouring machine, in combination, mold frame holder adapted to be conveyed past said hopper beneath the valve thereof, a mold frame adapted to rest upon said mold frame holder having horizontally flanged end members and a plurality of spaced narrow ribs connecting said end members, and a plurality of connected molds having their connecting portions adapted to rest upon said ribs and horizontally extended end portions overlying the horizontally flanged end members of the mold frame, the extended end portions of said molds protecting the mold frame and mold frame holder from droppings from said pouring valve and being turned over and under said flanged end members of said mold frame and the molds having concave mold portions extending individually down between each pair of spaced ribs in said mold frame.

3. In a mold structure adapted to cooperate with a pouring valve of a hopper upon a confectionery pouring machine, in combination, a mold frame holder adapted to be conveyed past said hopper beneath the same and having supporting portions extending upwardly, a mold frame supported upon said supporting portions, and a mold disposed upon said mold frame and having a substantially smooth straight upper surface portion projecting outwardly and covering and thereby protecting said mold frame and mold frame holder from material dropping upon the same from said hopper and valve.

JENS JOHANNES JENSEN.